US008655885B1

(12) United States Patent
Scott et al.

(10) Patent No.: US 8,655,885 B1
(45) Date of Patent: Feb. 18, 2014

(54) MEDIA CATALOG SYSTEM, METHOD AND COMPUTER PROGRAM PRODUCT USEFUL FOR CATALOGING VIDEO CLIPS

(75) Inventors: Michael Scott, Washington Grove, MD (US); Tom Trainer, Bethesda, MD (US); Guy Hellier, Catawba, VA (US); Oliver Gallienne, Oxfordshire (GB)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 13/432,555

(22) Filed: Mar. 28, 2012

Related U.S. Application Data

(60) Provisional application No. 61/469,007, filed on Mar. 29, 2011.

(51) Int. Cl.
*G06F 7/00* (2006.01)
*G06F 17/30* (2006.01)

(52) U.S. Cl.
CPC .... *G06F 17/30613* (2013.01); *G06F 17/30053* (2013.01); *G06F 17/30775* (2013.01); *Y10S 707/913* (2013.01)
USPC ............ 707/740; 707/725; 707/795; 707/913

(58) Field of Classification Search
CPC ..................... G06F 17/30613; G06F 17/30053; G06F 17/30775
USPC .................................. 707/725, 740, 795, 913
See application file for complete search history.

(56) References Cited

U.S. PATENT DOCUMENTS

| | | | |
|---|---|---|---|
| 7,827,489 B2* | 11/2010 | Ubillos ......................... | 715/716 |
| 8,533,156 B2* | 9/2013 | Ryder ........................... | 707/626 |
| 2002/0035732 A1* | 3/2002 | Zetts ............................. | 725/148 |
| 2006/0180007 A1* | 8/2006 | McClinsey ...................... | 84/645 |
| 2007/0033632 A1* | 2/2007 | Baynger et al. ................ | 725/135 |
| 2007/0050467 A1 | 3/2007 | Borrett et al. | |
| 2008/0127281 A1* | 5/2008 | Van Flandern et al. ......... | 725/87 |
| 2008/0295028 A1* | 11/2008 | Nagasaka et al. ............. | 715/810 |
| 2009/0049118 A1* | 2/2009 | Stevens ......................... | 709/203 |
| 2009/0116812 A1* | 5/2009 | O'Brien et al. ................. | 386/52 |
| 2010/0042642 A1* | 2/2010 | Shahraray et al. ............. | 707/102 |
| 2010/0306656 A1 | 12/2010 | Moloney et al. | |
| 2011/0154290 A1* | 6/2011 | Kelly ............................ | 717/110 |
| 2011/0239119 A1* | 9/2011 | Phillips et al. ................ | 715/731 |

* cited by examiner

*Primary Examiner* — Phong Nguyen
(74) *Attorney, Agent, or Firm* — Sprinkle IP Law Group

(57) ABSTRACT

Embodiments disclosed herein provide a new way to catalog digital assets derived or otherwise created from an original source such as a video, clip, movie, film, or the like. In one embodiment, time-based metadata, along with technical metadata and business metadata can be captured within a video and collected locally at a client device running media catalog client software. The collected information can be communicated to a media catalog server at the back end. The media catalog server can create a new asset based on the collected information and store the asset in a database. Multiple assets may be created to describe and reference the same video. However, the video itself is not modified and no variation of the video is created in anyway.

20 Claims, 2 Drawing Sheets

MEDIA CATALOG SYSTEM, METHOD AND COMPUTER PROGRAM PRODUCT USEFUL FOR CATALOGING VIDEO CLIPS

CROSS-REFERENCE TO RELATED APPLICATION(S)

This is a conversion of and claims a benefit of priority from U.S. Provisional Application No. 61/469,007, filed Mar. 29, 2011, entitled "MEDIA CATALOG SYSTEM, METHOD AND COMPUTER PROGRAM PRODUCT USEFUL FOR CATALOGING VIDEO CLIPS," which is fully incorporated by reference herein.

TECHNICAL FIELD

This disclosure relates generally to digital asset management. More particularly, embodiments disclosed herein relate to a media catalog system, method, and computer program product capable of capturing time-based metadata, useful for cataloging the content of videos.

BACKGROUND OF THE RELATED ART

Digital asset management (DAM) generally refers to a business process or a software tool for organizing the creation, management, distribution and archiving of digital assets. Specifically, digital asset management may involve the creation of an archive, the development of an infrastructure to preserve and manage digital assets and a search functionality that allows end users to identify, locate and retrieve digital assets.

At its simplest, a digital asset management system may simply involve a set of database records. Each of such database record may represent a digital asset and may contain information about that digital asset. As an example, a database record may contain the name and format of an image file, the date the image file was created, the name of the person who created the image file, and so on. In some cases, the database record may include additional information such as the content of the image file.

While digital media management technologies were once used exclusively by publishing and media companies, they are increasingly being incorporated into content management systems to manage other digital assets such as photos, music, videos, animations, podcasts and other multimedia content. These technological advances continue to bring challenges to business operations management. Consequently, there is always room for innovations and improvements.

SUMMARY OF THE DISCLOSURE

With the growing use of media, it is increasingly important for an entity to have the ability to manage their digital assets efficiently and effectively. Embodiments disclosed herein provide a media catalog system, method, and computer program product capable of capturing time-based metadata within an original source such as a video, clip, movie, film, or the like. Time-based metadata may include a start time and an end time defining a portion or segment of the original source. This segment may have business value to an entity such as a corporation or company.

In some embodiments, a software component of a media catalog system may operate on a client device to present an end user with a source media and to continuously monitor local events occurring at the client device. In one embodiment, the software component may comprise a user interface through which the end user can interact with the source media. The user interface may include a built-in media player, a scrub bar, and a clip creation button. The media catalog client software component may monitor user interactions with the user interface relative to the source media being displayed through the media player and collect a set of information that may be used to create an asset at the back end.

Within the context of this disclosure, an asset may refer to a collection of information containing a reference to the source media, time-based metadata associated with a particular segment in the source media, technical metadata about the source media and/or the segment thereof, and business metadata describing the content of the source media.

In one embodiment, the collected information, including time-based metadata, technical metadata, business metadata, and so on, may not be communicated to a server computer at the back end until the user selects the clip creation button or otherwise causes an asset to be created. Responsive to such a user action, the media catalog client software component may operate to send the collected information to a server computer implementing the media catalog system at the back end and instruct the server computer to create an asset accordingly.

As an example, if the source media is a movie, an asset can be a virtual clip of the movie. In creating such a virtual clip, no part of the movie is modified or duplicated. Multiple virtual clips (assets) of the movie can be created this way, providing an extremely efficient way to reduce the storage requirement usually associated with handling a large number of clips and/or large media files.

The media catalog system can create multiple renditions at the time the new asset is generated. The asset and any renditions thus created may be persisted in a file system and referenced in an asset database.

Multiple assets may be created to describe and reference the same video. However, the video itself is not modified and no variation of the video is created in anyway.

A DAM system implementing an embodiment of the media cataloging methodology disclosed herein can greatly simplify the process of creating, managing, and distributing rich media for Web, print, broadcast, and other marketing and content channels.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Figure 1:
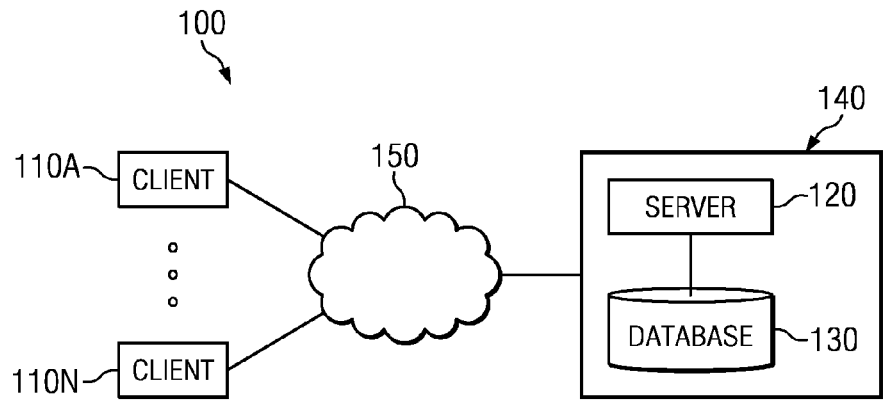
FIG. 1 depicts a diagrammatic representation of a simplified network architecture illustrating an example network environment in which embodiments disclosed herein may be implemented.

Before discussing embodiments of invention, a hardware architecture where embodiments disclosed herein can be implemented is described with reference to FIG. 1. In FIG. 1, network computing environment 100 may comprise network 150. Network 150 can represent a private network, a public network, or a virtual private network (VPN). A company's intranet might be an example of a private network and the Internet might be an example of a public network. A VPN uses primarily public telecommunication infrastructure, such as the Internet, to provide remote users with a way to access an internal network of an organization or entity. Enterprise computing environment 140 might be an example of an internal network of a business entity. Various types of networks are known to those skilled in the art and thus are not further describe Network 150 can be bi-directionally coupled to a variety of networked systems, devices, repositories, etc.

In the simplified configuration shown in FIG. 1, network computing environment 100 may comprise server computer 120, database 130, and a plurality of client computers and/or devices 110A-N. Virtually any piece of hardware or electronic device capable of running client software and communicating with a server can be considered a client device. As an example, a client device may include a central processing unit (CPU), a read-only memory (ROM), a random access memory (RAM), a hard drive (HD) or non-volatile memory, and one or more input/output (I/O) device(s). An I/O device may be a keyboard, monitor, printer, electronic pointing device (e.g., a mouse, trackball, touch pad, etc.), or the like. The example hardware configuration described above can be representative of other devices and computers alike coupled to network 150 (e.g., desktop computers, laptop computers, personal digital assistants, handheld computers, cellular phones, and any electronic devices capable of storing and processing information and network communication).

Server computer 120 and database 130 may reside in enterprise computing environment 140 owned and operated by an organization or entity. Server computer 120 may represents one or more server computers in enterprise computing environment 140. Server computer 120 may implement an embodiment of a media catalog system disclosed herein. In one embodiment, the media catalog system may be part of a digital asset management (DAM) system. The media catalog system may have access to database 130. Database 130 may store data used by the media catalog system. In some embodiments, a client device may send information to server computer 120 over network 150 and server computer 120 may operate to cause a response to be displayed on the client device.

As one skilled in the art can appreciate, the exemplary architecture shown and described herein with respect to FIG. 1 is meant to be illustrative and not limiting. Further, embodiments disclosed herein may comprise suitable software including computer-executable instructions. As one skilled in the art can appreciate, a computer program product implementing an embodiment disclosed herein may comprise one or more non-transitory computer readable storage media storing computer instructions translatable by one or more processors in network computing environment 100. In an illustrative embodiment, some or all of the software components may reside on a single computer or on any combination of separate computers.

Figure 2:
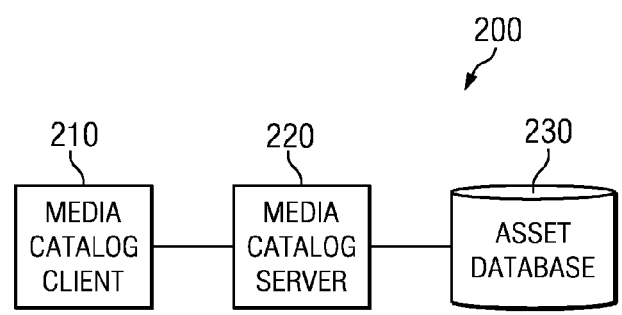
FIG. 2 depicts an example of one embodiment of a media catalog system.

With that in mind, turning now to FIG. 2 which depicts an example of one embodiment of a media catalog system in which a first software component resides on a client device and a second software component resides on a server computer. More specifically, in the example of FIG. 2, media catalog system 200 may comprise media catalog client software component 210 and media catalog server software component 220. Media catalog client software component 210 can be configured to run on a client device such as client device 110A and media catalog server software component 220 can be configured to run on a server computer such as server computer 120. In an illustrative embodiment, media catalog system 200 can be part of a digital asset management system operating in enterprise computing environment 140.

In one embodiment, media catalog system 200 may further comprise asset database 230 communicatively connected to server 220. In one embodiment, this asset database may be centrally located and be the only database utilized by the media catalog system to store assets thus created for and/or by an entity such as a company or a business. In one embodiment, the asset database may simply store references to locations in a file system (not shown) where assets are persisted. As an example, in one embodiment, asset database 230 may implement a table storing references to relative locations of assets of a particular entity, each asset being stored at a location relative to a root node of a file system.

Other types of persistent storage mechanisms may also be utilized. For example, in one embodiment, asset database 230 may implement a table storing identifiers that can be used by an application programming interface (API) to retrieve assets from a hierarchical storage. Those skilled in the art can appreciate that various implementations of asset database 230 referencing assets persisted at other storage location(s) are possible and anticipated. This arrangement can help the media catalog system to perform very efficiently and not be affected by the size and/or number of assets.

In one embodiment, a media catalog system may be configured to support multiple entities, each having a dedicated asset database storing proprietary assets. In this context, an asset may refer to an object that has value to a particular entity according to some kind of business rules or purpose.

In a typical DAM system, the term "asset" may refer to a file that is stored in a digital format and that is detailed by its metadata. This kind of metadata is referred to herein as file metadata. File metadata may describe, for example, what a file contains, how to encode/decode the file, from where the file is originated, who owns the file, who can access the file, and so on.

File metadata can be useful in performing text based searches in DAM systems. For example, through a DAM user interface, an enterprise user may enter a query that has one or more keywords. The DAM system may search across all available digital assets looking for file metadata that match the keyword(s) and return any matching digital asset(s) to the user.

However, while file metadata may describe a video file in a general sense, it does not describe time based events occurring in the video. Because video content is time based, the description of the video can change from one frame to the next. Thus, additional support is needed for managing video content. Embodiments of a media catalog system and method disclosed herein can provide the necessary support for managing video content in an efficient and effective way.

Within the context of a media catalog system, an asset may refer to a collection of different types of data. An asset may have a master content file. This can be a primary content file of the asset. One or more sub-files may be stored with the master content file. The definition of what constitutes "an asset" can be configurable depending upon a business model. For example, for a radio program, an audio track can be the master content file while a transcript for the audio track can be a sub-file. However, the same transcript can be an asset for an online magazine. Suppose the audio track and the transcript are both considered "assets" for yet another entity, these assets can be linked in that entity's media catalog.

An asset in the media catalog system can have zero or more files, zero or more metadata, and zero or more tags. That is, the media catalog system does not require that an asset must have a master content file. An asset in the media catalog system can have metadata only. An asset that does not have any file can be used as a place holder. In the media catalog system, an asset may have information for the security, tagging, cataloging of the asset so end users of the media catalog system can search and find it again and reuse it if desired. In this sense, an asset can be any digital object that has value to an entity operating the media catalog.

In some embodiments, a media catalog system may optionally provide various types of files associated with the master content file. For example, the media catalog system may provide a proxy content file which, in one embodiment, can be a streamable video media file encoded at a lower frame resolution and/or bitrate for the purpose of viewing the media over a remote web connection. In one embodiment, the media catalog system may provide one or more renditions of the master content file. A rendition can be a file that carries the same content as the master content file but in a different (and typically lower resolution) format. These renditions are stored with the master content file and considered part of the asset, not as separate assets.

Figure 3:
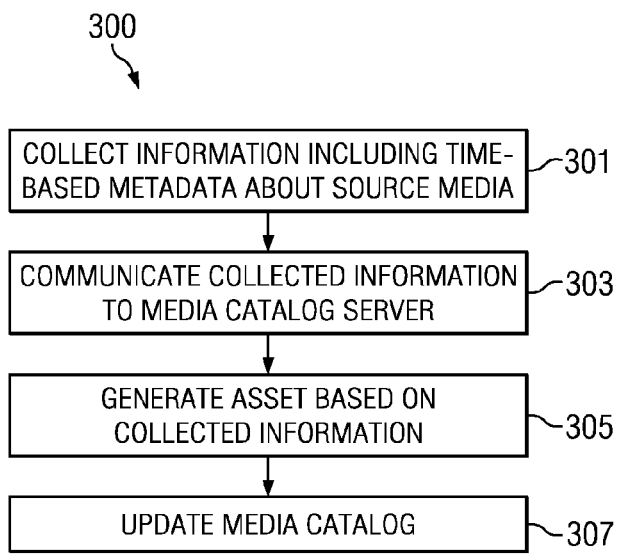
FIG. 3 depicts an example of one embodiment of a method of media cataloging.
Figure 4:
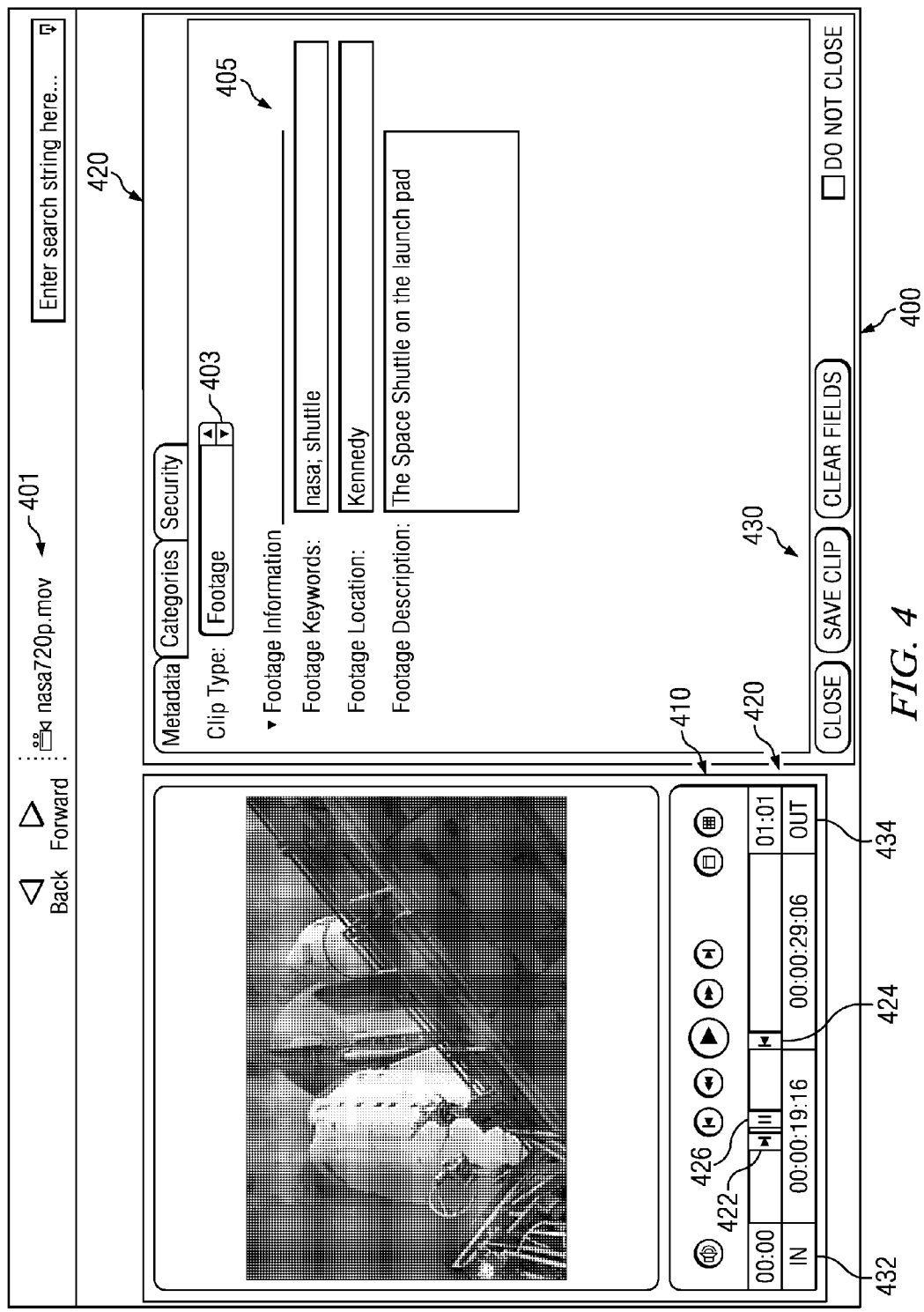
FIG. 4 depicts an example of one embodiment of a user interface of a media catalog function.

FIG. 3 depicts an example of one embodiment of a method for media cataloging. In some embodiments, media catalog client 210 may operate on a client device to present a source media such as a movie, a video, a film, or any time-based presentation to an end user. Media catalog client 210 may continuously monitor local events occurring at the client device. Referring to FIG. 4, in one embodiment, media catalog client 210 may comprise user interface 400 through which the end user can interact with source media 401 which, in this example, is entitled "nasa720p.mov".

User interface 400 may comprise media player 410, scrub bar 420, and clip creation button 430. Media catalog client 210 may monitor user interactions with user interface 400 relative to source media 401 and collect a set of information (step 301). The set of information thus collected may include a reference to source media 401 and time-based metadata such as start time 432 and end time 434. A duration defined by start time 432 and end time 434 may represent a segment of source media 401. This segment may have business value to the entity operating media catalog system 200. In addition to time-based metadata, the set of information may also include technical metadata and business metadata about source media 401.

In this example, the collected information may not be communicated to media catalog server 220 until the user clicks on or otherwise selects clip creation button 430. In response, media catalog client 210 may operate to communicate the collected information to media catalog server 220 (step 303). In one embodiment, this can be achieved by making an Action Message Format (AMF) call to media catalog server 220. AMF protocols including AMF calls and AMF objects are known to those skilled in the art and thus are not further described herein. In this case, the AMF call to media catalog server 220 may include an AMF object containing the collected information and an instruction to create a brand new asset.

In response, media catalog server 220 may operate to generate an asset (step 305). In embodiments disclosed herein, assets can be generated by a media catalog server without any modification to the source media and without creating any variation of the source media. This is possible because an asset in the media catalog system can have metadata only—for instance, time-based metadata, technical metadata, and business metadata about a source media. No portion of the source media is required. A metadata-only asset may be referred to as a metadata asset.

In some embodiments, media catalog server 220 may further operate to associate the newly generated asset with the original source (source media 401 in the example of FIG. 4). In some embodiments, media catalog server 220 may take additional actions, according to a set of predetermined rules, policies, and/or conditions, at the time a new asset is generated. For example, media catalog server 220 may operate to generate a plurality of renditions of the new asset utilizing the frame resolution and/or bitrate information contained in the technical metadata about the new asset. The asset and any renditions thus created may be persisted in a file system and referenced in an asset database.

In some embodiments, media catalog server 220 may further operate to update its media catalog to include the new asset (step 307), making the new asset a part of the media catalog available to other users of the DAM system. In one embodiment, this can be done by updating an index for the media catalog to include a reference to a storage location where the asset is persisted.

Multiple assets may be created to describe and reference the same source media. For example, if a source media is a video, multiple metadata assets can be generated and each of the multiple metadata assets may represent a virtual clip of the video. In creating these virtual clips, no part of the video is modified or duplicated in anyway.

A sample use case illustrating how a virtual clip can be created using an embodiment of a media catalog system will now be described with reference to FIG. 4. A user may search and/or browse the media catalog system, via user interface 400, to find any footage of a NASA shuttle. In this example, suppose a video asset having a master content file named "nasa720p.mov" contains a story involving NASA and the user desires to create a virtual clip showing just a segment on the NASA shuttle. Accordingly, "nasa720p.mov" is identified as source media 401 and displayed on media player 410.

As illustrated in FIG. 4, the user may interact with scrubber or scrub bar 420 to define the segment of interest by moving start time marker 422 and end time marker 424 along scrub bar 420. When start time marker 422 is left by the user on scrub bar 420 at a temporal position relative to the length of source media 401, a start or "IN" timecode is collected. In this case, start time marker 422 is left at 19 minutes and 16 seconds into an hour and one minute of the total length of "nasa720p.mov". This temporal position may be referred to as the "in point."

Likewise, when the user leaves end time marker 424 at a temporal position relative to the length of "nasa720p.mov", an end or "OUT" timecode is collected. In this case, end time marker 424 is left at 29 minutes and 6 seconds relative to the total length of "nasa720p.mov". This temporal position may be referred to as the "out point."

The user may move frame positioner 426 between the start time marker and the end time marker to view frames in the now defined segment of source media 401. The user may specify a clip type for the segment (via Clip Type menu 403 in the example of FIG. 4) and enter clip data relevant to the clip type relevant to the clip type (via Footage Information 405 in the example of FIG. 4).

The media catalog system may collect these pieces of information locally, at the client device on which user interface 400 is provided to the user. Since the user may clear the fields and/or decide not to create a virtual clip for the segment that the user has marked thus far, there is no need to constantly communicate the collected information to the back end until the user is ready to create the virtual clip. As discussed above, the user can indicate their desire to create the virtual clip by clicking on or otherwise selecting clip creation button 430. The virtual clip thus created is distinguished from an actual clip of source media 401. The former contains metadata only (and hence may be referred to as a metadata asset) and the latter contains a portion of the content of source media 401.

Responsive to the user's desire to save the segment (whether the segment is saved as a virtual clip or an actual clip can be transparent to the user) the media catalog system can create a metadata asset and return control to the user. The system may grab the frame image from the "in point" to use as the thumbnail and return the thumbnail to the user. Optionally, the system may allow the user to select a frame in the video player and choose to use the user-selected frame as the thumbnail.

In some embodiments, this metadata asset may be saved in an asset database as a searchable database record. The user may create additional asset(s) describing the same video. These metadata assets can be separate and independent from one another or they may overlap in part in some cases. As discussed above, in creating this metadata asset the media catalog system does not modify the video file "nasa720p.mov" or create a new video. This allows media cataloging to be done in an efficient and cost effective manner. Creating a new video that is a copy or a portion of another video may be allowed in some cases. However, they are not considered metadata assets.

Aspects of a system implementing a media catalog feature or function will now be described below.

1. Media Catalog Operation 1.1 Access Control and Security

In some embodiments, the system can provide a Functionality Enablement Token (FET) to be used for granting role-based permission to use the Media Catalog feature. In some embodiments, without the FET, the user may not know the Media Catalog functionality exists. In this sense, the FET acts as an on/off switch for the system's menu to either allow or deny access to the Media Catalog functionality.

The system can provide a FET to be used for granting role-based permission to Create and Edit Clip records within the Media Catalog. The system can require a user to have both the View Asset permission on a specific Video or Clip asset and the Media Catalog FET before being allowed to open the Media Catalog feature for that asset.

1.2 Media Catalog Accessibility within Asset Inspector

In some embodiments, the system can provide the Media Catalog feature within a software component called "Asset Inspector". Any user with Asset Security permissions to view a given Video or Clip asset and the Media Catalog FET may open the Media Catalog from within the Asset Inspector. A user able to view the Media Catalog can similarly have access to all components of the Media Catalog. Functions accessible within the components of the Media Catalog may be controlled via FETs.

Once in the Media Catalog for a given Video or Clip asset, navigating to the next or previous asset in a collection (from the controls within the Asset Inspector) can bring forth the Media Catalog for the next or previous asset, if it is a Video or Clip asset. If the next or previous asset is not a Video or Clip asset, then the Media Catalog feature may not be present in the Asset Inspector and therefore may not be shown and the Metadata sub-pane of the Properties pane of the Asset Inspector can be shown.

The Media Catalog feature can disable the Clip Records pane since the system may not support the creation of "clips of clips". In some embodiments, a tool tip on the disabled pane of the Asset Inspector can read "The asset you are viewing is a Clip Asset, which cannot have sub-clips. So the Clips pane is disabled." A Clip Asset cannot have sub-clips because a Clip Asset is a metadata asset and, as discussed above, does not contain any portion of the actual video or clip.

1.3 Media Catalog Accessible from URL

In some embodiments, the system can support the generation of a universal resource locator (URL) whereby a user can directly open the Media Catalog feature for a specific asset by opening the URL in a browser. The result of this action can be the same as if Media Catalog was accessed by any other method, for instance, from the Asset Inspector. From there the user can select the media catalog tab of the asset. Navigating to a specific asset via the Media Catalog feature can be unlike navigating to a website on the Internet. For example, the Media Catalog feature may not be based on Hypertext Transfer Protocol (HTTP) and the URL does not reference a web page.

1.4 Media Player Configuration

In some embodiments, the system can display the video player in the Media Catalog according to user preferences for video players and/or Video Playback requirements. If an appropriate proxy video format and video player combination is found, and if the player cannot be loaded inside the native Flex user interface (UI), the system can launch the Media Catalog as a separate window with the player embedded as the proxy video player.

The initial position and size of the detached player can be identical to the size and position of the Media Catalog the last time it was launched. The Media Catalog feature can support the media player being detached from the parent window and both resized and re-positioned anywhere on the user's screen. Note this detached player is not Media Catalog. Rather, it is a playback of the original source proxy. Further the Media Catalog feature can support positioning of a detached media player for users who have dual-screen desktop configurations. If a user detaches the media player and does not already have an implicit Preference for position and magnification, or if the implicit preferences are no longer valid, the system can revert to the default settings for size and positioning. In some embodiments, the media player size and positioning preference data may not be required to be identical across the native Flash player and any media players, but the system can at apply implicit preferences consistently for each player.

1.5 Layout Configuration

In some embodiments, when first opened for a specific asset the default view for the Media Catalog feature can be the Info pane. The media player can be positioned on the left side of the Media Catalog screen and sized to match the dimensions of the left pane of the Asset Inspector and the left pane of the Asset Inspector can carry the same width as the previous visit to the Asset Inspector.

As the user switches between features within the Media Catalog, the media player may not be re-sized or re-positioned, unless manually done by the user. If the asset being inspected is a Clip Asset, on the Asset Inspector can be an action control that enables the user to navigate from the Clip Asset Inspector directly to the Master Asset Inspector for the Clip's Master. This control can be presented to the user if the user has View permission on that Master Video Asset. This can provide an indicator that this is a Clip Asset and the action can be placed in the Asset Inspector.

1.6 Adding Clip Assets to Collections

In some embodiments, the Media Catalog can support that a Clip asset be draggable from the Media Catalog to a folder instance found in a different view window. This action can add the Clip asset to the folder. In one embodiment, the Clip asset may not be moved from the Media Catalog to the folder instance. In one embodiment, an existing, stored Clip asset may be dragged from the Media Catalog to a folder. In one embodiment, no assets or Clip assets may be dragged into the Media Catalog for any purposes.

2. Clip Creation

In some embodiments, Clip Creation may be possible from any subpane in the Asset Inspector if the asset of interest is a video asset, specifically a master video asset rather than a clip asset. As discussed above, the Media Catalog enables a user to make a clip creation, especially marking the in and out points, with significantly increased and streamlined usability.

2.1 Clip Creation Process

In some embodiments, the process for creating a Clip asset can be supported from any subpane in the Asset Inspector, if the asset is a master video asset. It may not be possible to create "a clip of a clip" from within the Asset Inspector of a Clip Asset.

The system can allow the user to set "In" and "Out" timecodes for the creation of a clip, from anywhere in the Asset Inspector, manually by typing in timecodes or by using specialized functions provided in the player and Media Catalog. Any timecode represented in the In and Out timecode controls can be represented as an SMPTE (Society of Motion Picture and Television Engineers) timecode (e.g., HH:MM:SS:FF) accurately using the drop frame separator if the video uses a drop frame timecode. In some cases, a user can use a ":" separator between the Seconds and Frame for non-drop-frame, and use a ";" (semi-colon) separator between the Seconds and Frame for dropped-frame timecodes.

Until a valid In and Out timecode have been specified, either the control that enables the user to create a clip asset based on the specified timecode range can be disabled or the user can get a message indicating that a clip cannot be created without both timecodes.

The timecode range between the In and Out timecodes can be highlighted in the Media Player according to the In and Out timecodes established in the In and Out Timecode controls. The specified In and Out timecodes can be edited by the user up to the point that the user selects to create (i.e. save) a clip asset based on the timecode range.

Upon selecting to create a clip asset based on a timecode range, the video player can limit the timecode range of the player to the timecode range of the specified In and Out timecodes. In some embodiments, all playback, scrubbing, frame advance, timecode seek, fast-forward and fast-reverse of the video while using the Clip creation function can be limited to the specified timecode range. In some embodiments, while in this clip creation mode, the In and Out timecodes may be changed.

In some embodiments, when the user selects to create a Clip Asset, the system can validate that the In and Out timecodes are valid and within the timecode range of the Master Asset and disallow the user from creating the Clip Asset if either Timecode is invalid or if the End timecode pre-dates the Start timecode.

When the user selects to create a Clip asset, the system can present to the user the Clip Creation function. This can enable the user to specify the Clip Type (which is in fact a metadata model), metadata, security and categories for the new Clip Asset. In some embodiments, the Clip Creation function can resemble the Import function views and the requirements can be similar.

While in the Clip Creation function, the user may be able to playback the timecode range defined to be the Clip asset timecode range. From within the Metadata section of the Clip Creation function, the user may specify "Clip Type", which represents the model for the new Clip asset.

In some embodiments, the list of Clip Types can include system-configured models, customized models, or a combination thereof. In some embodiments, these Clip Type models can appear in the Clip Creation UI, the Media Catalog's Clip Records pane, and may not appear within the Import UI, the Expert Search UI, or the View Preferences. In some embodiments, to the user, throughout the application, Clip Types may appear as a separate concept from Models.

In some embodiments, from within the Clip Creation function, the user may be able to edit the Clip Type, Metadata, Security and Categories. In some embodiments, Import requirements can apply for specification of Metadata, Security and Categories of the Clip Asset, including the use of Property Templates which can be limited to those Property Templates that carry a model that is designated to be a Clip Asset Model.

In some embodiments, when the user completes the specification of the In and Out timecodes, the Metadata, Security and Categories, and selects to create the Clip Asset, the system can create the Clip Asset and optionally navigate the user back to the pane of the Asset Inspector from which the user launched the Clip Creation tool (refreshing it as needed), or keep the Clip Creation function open so the user can create another clip. A control in the Clip Creation function can determine which of these two options is chosen.

2.2 Editing Clip Assets

In some embodiments, once a Clip Asset is created and stored, the system may not permit the editing of timecodes related to the Clip asset.

In some embodiments, the system may allow the user to edit the Properties of a Clip asset via the Edit Properties function, not via the Clip Creation function.

3. Modeling Assets

The Media Catalog feature may allow an end user to generate Clip assets of different types. Each Clip Type can have its own metadata model. In some embodiments, the system may provide a metadata modeling tool referred to as "Metadata Editor." Metadata Editor may allow customization of metadata fields that an end user can view and/or modify in describing an asset. Metadata Editor may comprise a user interface through which a product placement model may be defined by metadata describing a particular product, duration of the product appearance in video content, relative size/position of the product in video content, rights associated with the product that appears, etc. Suppose the product is licensed by a production company from a business entity that owns the product, this has a benefit of allowing the production company and the business entity alike to leverage the time-based metadata for royalty payment calculation purposes.

In addition to allowing multiple assets describing the same video clip differently according to different models, in some embodiments, the media catalog system may allow multiple assets describing the same video clip be defined according to different access privileges, roles, user groups, markets, broadcast standards (e.g., 33 frames per second, 24 frames per second, etc.), regions, languages, countries, and so on. For example, broadcasters in New York and California may have access to the same video file but are provided with different metadata assets tailored for their respective audiences.

In some embodiments, the above-described media catalog system and method can be part of a production process. In tape-based broadcast systems, accurate timecode is critical as the master control has to know when to play which clip for what segment—for instance, what timecode to start a specific segment and what timecode to end that segment. Some embodiments of a media catalog system can work as part of a frame-accurate post production process. For example, the definition of a video clip (timecode range) specifies when a commercial should play and when it should stop. When a broadcaster licenses the video content to a licensee, the licensee can schedule their ads to be inserted into the broadcast content at these specific timecode ranges. This enables the licensee to operate with the video content without having to analyze it first.

Embodiments of a media catalog system and method disclosed herein can be helpful for search and reuse of content, particularly in identifying the subject matter within a video asset. For example, a production crew shot a video of a whale in open sea. The video or footage may be an hour long and the whale shoots up three times in the air within that hour of footage. The production crew can use an embodiment of the media catalog system to catalog production content and capture when those whale jumps occur in the video. The media catalog system can store the captured information as a metadata asset and publish the metadata asset for subsequent use. A user looking for a whale jumping out of the water within an entire media repository not only can find the footage but also can find when the whale jumps within that hour of video. The user can use this information in the metadata asset to shorten the search time in editing a frame accurate (actual) clip that utilizes the original footage.

Other uses of metadata assets are also possible. For example, time-based metadata can be used to catalog when a particular actor appears in a movie, when a touch-down occurs in a foot ball game, how and where a soda can appears in a scene and for how long, etc.

In another example media cataloging use case, a user may invoke video management software called Inspector to review video assets for segments that need to be cataloged. The user may initiate a Create Clip action, then begins playback, or the user may begin playback and then want to create a clip. In either case, the user is already "in" the video. In some embodiments, the media catalog functionality disclosed herein may be made available to the user as a separate software tool. In some embodiments, a Media Catalog user interface is integrated with the Asset Inspector to maintain the context within which the user edits or creates clips. This allows the user to review and create or otherwise interact with the system all seemingly through a single user interface.

For example, the user may be reviewing a video asset in the Asset Inspector and is playing, stopping, scrubbing, etc. If at any time the user sets valid in and out points in the inspected master video (e.g., via dragging, shift selecting in the Keyframes, etc.), the system may operate to enable a "Create Clip" button near the master video or in a tab's header. Upon the user clicking the "Create Clip" button, the system may operate to create a clip as defined by the in and out points and may automatically launch that clip in a "Media Catalog" pane within the Asset Inspector. The system may include the specification of the Clip Type. The selection of the Clip Type designates what fields will be presented to the user for the clip. For example, one Clip Type might be titled "Product Placement" and when that is selected the user would see fields titled "Product Name", "Product Position", "Contract Number", etc. And if instead the user selected a Clip Type titled "Soccer Goal" (obviously used for cataloging soccer content), the fields presented might be titled "Player", "Score", "Assisted by", etc. The user can utilize the Media Catalog functionality to add metadata, specify category and security, save, etc. The system may save the information as a new metadata asset and return the user to the inspector where the new clip, complete with in and out timecodes and properties, is indicated in the Clips pane of the Asset Inspector.

As described above, the system does not create a new video file for this new clip, but a new asset containing the time-based metadata describing the new clip and referencing the master video. The user may cancel before saving the information. The system may provide the user with a warning that such an action may abandon all unsaved clip creation(s) up to that point.

In one embodiment, opening the Asset Inspector for a master video would provide the "Media Catalog" pane. In one embodiment, the Asset Inspector would be opened for a Clip asset without the "Media Catalog" pane.

In some embodiments, if the user at any time has valid in and out points selected in an inspected (master) video and has any clip selected, the user can select an action menu item on the selected clip. For example, selecting an action menu item "Reclip at selected in/out points" may cause the system to change the in and out timecodes for that clip, but maintains the existing metadata, category, security, and so on associated with the clip. In some embodiments, the system may save this as a new metadata asset or modify the existing metadata asset.

In some embodiments, editing the properties of the clip can be done via "Edit Properties" which is a function of the Asset Inspector. In some embodiments, editing the properties of the clip can be done from within the Media Catalog functionality. In some embodiments, when editing the timecodes for an existing clip, the edit action may be accessible only from within the Media Catalog of the master.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for media cataloging, comprising:
   at a client device having a processor and at least one non-transitory computer readable medium storing instructions translatable by the processor, collecting, by the client device, a set of information associated with a source media, the set of information comprising time-based metadata about a portion of the source media;
   responsive to a user action at the client device, the client device communicating the set of information to a server computer over a network connection, wherein the user action is part of user interactions with the source media via a user interface running on the client device;
   the server computer generating an asset based on the set of information, the asset generated without any modification to the source media and without duplicating the portion of the source media; and
   the server computer updating a media catalog to include the asset.

2. The method of claim 1, further comprising:
   continuously monitoring events at the client device, the events comprising an indication that the user has positioned a marker at a temporal point relative to an overall playtime of the source media; and
   storing a timecode corresponding to the temporal point on a memory of the client device.

3. The method of claim 1, further comprising:
persisting the asset at a storage location, wherein the media catalog comprises a reference to the asset at the storage location.

4. The method of claim 1, further comprising:
storing a reference to the asset in an asset database.

5. The method of claim 1, further comprising:
returning a thumbnail representing the asset from the server computer to the client device.

6. The method of claim 1, wherein the time-based metadata comprises a start time and an end time for the portion of the source media.

7. The method of claim 6, wherein the time-based metadata further comprises a duration defined by the start time and the end time.

8. The method of claim 1, wherein the set of information further comprises technical metadata about the portion of the source media and business metadata describing the portion of the source media.

9. A computer program product comprising at least one non-transitory computer readable medium storing instructions translatable by a client device and a server computer to perform:
at the client device, collecting a set of information associated with a source media, the set of information comprising time-based metadata about a portion of the source media;
responsive to a user action at the client device, communicating the set of information from the client device to the server computer over a network connection, wherein the user action is part of user interactions with the source media via a user interface running on the client device;
at the server computer, generating an asset based on the set of information, the asset generated without any modification to the source media and without duplicating the portion of the source media; and
updating a media catalog to include the asset.

10. The computer program product of claim 9, wherein the instructions are further translatable by the client device to perform:
continuously monitoring events at the client device, the events comprising an indication that the user has positioned a marker at a temporal point relative to an overall playtime of the source media; and
storing a timecode corresponding to the temporal point on a memory of the client device.

11. The computer program product of claim 9, wherein the instructions are further translatable by the server computer to perform:
persisting the asset at a storage location; and
storing a reference to the asset at the storage location in an asset database.

12. The computer program product of claim 9, wherein the instructions are further translatable by the server computer to perform:
returning a thumbnail representing the asset from the server computer to the client device.

13. The computer program product of claim 9, wherein the time-based metadata comprises a start time and an end time for the portion of the source media.

14. The computer program product of claim 9, wherein the set of information further comprises technical metadata about the portion of the source media and business metadata describing the portion of the source media.

15. A media catalog system, comprising:
a client device;
a server computer; and
at least one non-transitory computer readable medium storing instructions translatable by the client device and the server computer to perform:
at the client device, collecting a set of information associated with a source media, the set of information comprising time-based metadata about a portion of the source media;
responsive to a user action at the client device, communicating the set of information from the client device to the server computer over a network connection, wherein the user action is part of user interactions with the source media via a user interface running on the client device;
at the server computer, generating an asset based on the set of information, the asset generated without any modification to the source media and without duplicating the portion of the source media; and
updating a media catalog to include the asset.

16. The system of claim 15, wherein the instructions are further translatable by the client device to perform:
continuously monitoring events at the client device, the events comprising an indication that the user has positioned a marker at a temporal point relative to an overall playtime of the source media; and
storing a timecode corresponding to the temporal point on a memory of the client device.

17. The system of claim 15, wherein the instructions are further translatable by the server computer to perform:
persisting the asset at a storage location; and
storing a reference to the asset at the storage location in an asset database.

18. The system of claim 15, wherein the instructions are further translatable by the server computer to perform:
returning a thumbnail representing the asset from the server computer to the client device.

19. The system of claim 15, wherein the time-based metadata comprises a start time and an end time for the portion of the source media.

20. The system of claim 15, wherein the set of information further comprises technical metadata about the portion of the source media and business metadata describing the portion of the source media.

* * * * *